(12) United States Patent
Gomez et al.

(10) Patent No.: US 7,534,343 B2
(45) Date of Patent: May 19, 2009

(54) DEVICE FOR COLLECTING CLARIFIED WATER FOR A BASIN AND CORRESPONDING BASIN

(75) Inventors: Jean Gomez, Toulouse (FR); Patrick Eposito, Montauban (FR); Jacques Debuire, Fontenilles (FR)

(73) Assignee: OTV SA S.A., Saint-Maurice Cedex (FR)

( * ) Notice: Subject to any disclaimer, the term of this patent is extended or adjusted under 35 U.S.C. 154(b) by 0 days.

(21) Appl. No.: 11/573,021

(22) PCT Filed: Jun. 6, 2005

(86) PCT No.: PCT/FR2005/001380

§ 371 (c)(1),
(2), (4) Date: Apr. 17, 2007

(87) PCT Pub. No.: WO2006/024708

PCT Pub. Date: Mar. 9, 2006

(65) Prior Publication Data
US 2007/0227986 A1 Oct. 4, 2007

(30) Foreign Application Priority Data
Aug. 2, 2004 (FR) .................................. 04 08543

(51) Int. Cl.
*C02F 1/40* (2006.01)
(52) U.S. Cl. ..................... 210/122; 210/242.1; 210/540
(58) Field of Classification Search ................. 210/776, 210/800, 122, 242.1, 242.3, 540
See application file for complete search history.

(56) References Cited

U.S. PATENT DOCUMENTS

| 1,450,545 | A | * | 4/1923 | Hans ........................... 210/122 |
| 1,644,248 | A | * | 10/1927 | Goldman ................. 210/242.1 |
| 3,970,556 | A | * | 7/1976 | Gore ........................ 210/242.1 |
| 4,695,376 | A | * | 9/1987 | Astrom et al. ........... 210/242.1 |
| 4,746,424 | A | * | 5/1988 | Drew ....................... 210/242.1 |
| 5,104,528 | A | * | 4/1992 | Christie ...................... 210/540 |
| 5,387,055 | A | * | 2/1995 | Jenkins .................... 210/242.3 |
| 5,874,003 | A | * | 2/1999 | Rose ........................ 210/242.1 |
| 7,025,888 | B2 | * | 4/2006 | Thompson et al. .......... 210/776 |

FOREIGN PATENT DOCUMENTS

| DE | G 91 01 241.4 | 6/1991 |
| DE | 101 12 339 A1 | 10/2002 |
| WO | WO00/27498 | 5/2000 |
| WO | WO00/78424 | 12/2000 |

* cited by examiner

*Primary Examiner*—Christopher Upton
(74) *Attorney, Agent, or Firm*—Coats & Bennett, P.L.L.C.

(57) ABSTRACT

A water collection device for collecting clarified water in a basin. The collection device includes a floating ring having a water inlet recessed within the central portion of the floating ring. The water collection device is configured to facilitate a greater flow of water into the water inlet from one peripheral zone than another peripheral area or zone around the floating ring.

17 Claims, 2 Drawing Sheets

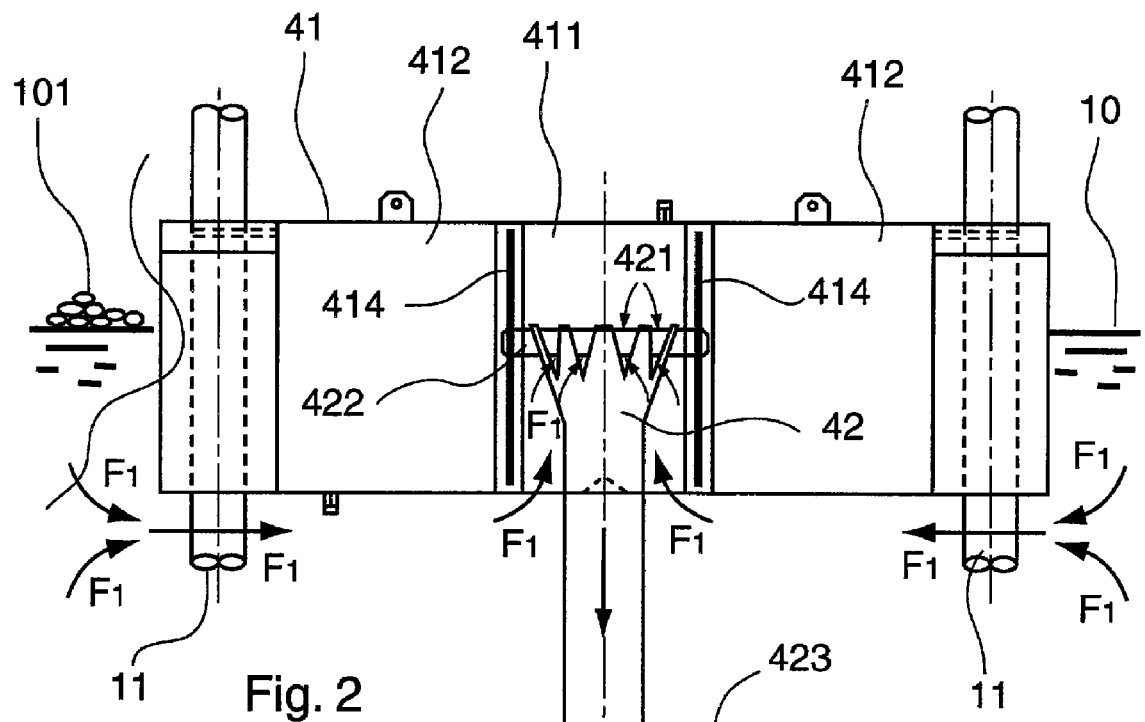
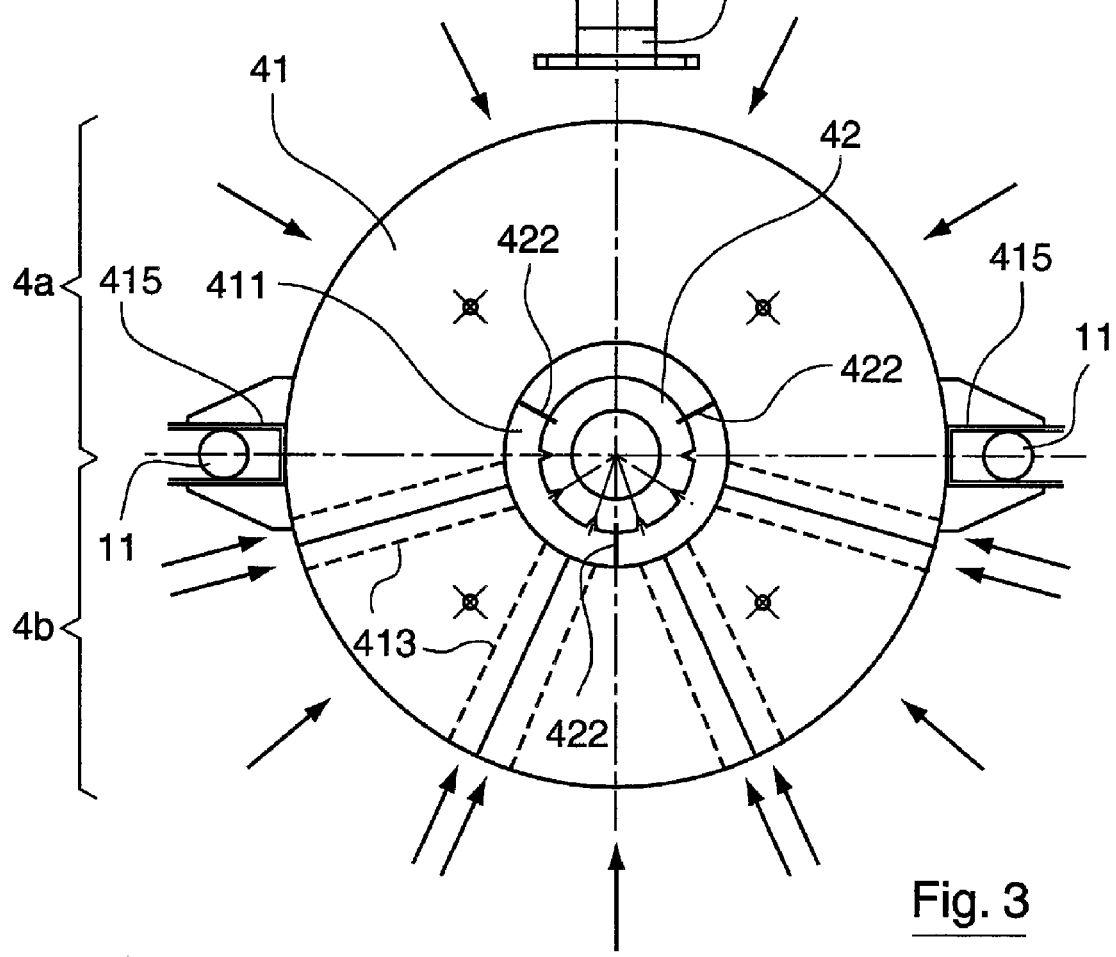

DEVICE FOR COLLECTING CLARIFIED WATER FOR A BASIN AND CORRESPONDING BASIN

This application is a U.S. National Stage application of PCT Application No. PCT/FR2005/001380, with an international filing date of Jun. 6, 2005. Applicant claims priority based on French application serial no. 04 08543 filed Aug. 2, 2004.

The field of the invention is the treatment of waste water. More precisely, the invention relates to equipment used in treatment stations for the treatment of industrial or domestic waste water.

One commonly used technique is the SBR (Sequencing Batch Reactor). This technique consists of bringing water into contact with activated sludge and alternately performing aeration and settlement sequences.

Therefore, the normal procedure in these stations is to use a single basin for oxygenation, stirring and settlement of water (using alternating sequences).

It can be understood that in this context, the general output from the station depends on the duration of each phase.

The treatment quality imposes a minimum time for each phase, particularly concerning settlement and sampling of the treated water.

At the present time, SBR stations usually use two techniques to collect clarified surface water during the settlement phase; one consisting of implementing a pumping installation suspended to two floats, and the other based on simple gravity flow using a funnel placed in a float.

The general objective during collection is to collect the clarified water as quickly as possible, obviously avoiding stirring the lower layers of the basin (containing settled sludges).

At the same time, collection is often done away from the edge basin. However nowadays it is often suggested that the collection point should be directly close to the concrete wall of the basin, to provide easy access either for maintenance operations or for making adjustments.

It is found that when collection points are planned at the edges of basins, the collection flow has to be adjusted to a relatively limited value.

When the objective is to increase this flow, it is found that the collected water is no longer clarified and contains sludge.

In other words, the position of the collection point at the edge of the basin improves access to collection means but this gain is accompanied by a disadvantage, which is that the general flow in a treatment station containing such a basin is limited, which is obviously not desirable.

In particular, the purpose of the invention is to overcome the disadvantages according to prior art.

More precisely, the purpose of the invention is to propose a basin for a treatment station in which the surface water collection means maintain accessibility advantages, while enabling higher collection flows than are possible with solutions according to prior art.

In this sense, the purpose of the invention is to provide such collection means that enable higher collection flows than are possible with prior art without stirring the lower layers in the basin.

Another purpose of the invention is to provide such collection means that give greater possibilities for adjusting the collection flow.

Another purpose of the invention is to provide such collection means that are stable on the water surface, even during vigorous stirring of water in the basin.

Another purpose of the invention is to provide such collection means that are simple in design and easy to install.

These objectives and others that will become clear later are achieved according to the invention that relates to a clarified water collection device designed to be used in a basin, of the type including a floating ring with a central recess inside which said clarified water will be collected by a collection device connected to means of collecting said clarified water, characterised in that it includes preferred water flow means to facilitate said collection of water at least from one peripheral zone around said floating ring rather than from another zone.

In this way, the sampling device can be placed immediately adjacent to the edge of the basin, which facilitates access to the device without any risk of disturbing the layer of settled sludge at the bottom of the basin.

Due to the preferred flow means, surface water collection on the side of the device facing the centre of the basin can be preferred instead of drawing off water present between the device and the concrete wall of the basin.

This thus avoids generating a flow with a uniform flow rate over 360° around the device. On the contrary, the flow rate on the wall side of the basin is limited, which avoids the creation of excessive collected water velocities that could cause stirring of the sludge layer at the bottom of the basin.

This increase in velocity is explained by the small cross-section of the water passage between the device and the wall of the basin, which tends to increase the flow to section ratio for a given flow.

Conventionally, collection rates may be as high as 150 $m^3/h$. With such flows, when the water passage cross-section on one side of the collection device is reduced, the increase in the water velocity drawn off from the side in question may become high, to the extent that it stirs the settled sludges.

Therefore compared with prior art, the invention can place the collection device in the basin such that the device is easily accessible, while maintaining the possibility of collection at a sustained rate, without any risk of harming the collected water quality.

According to one preferred solution, said water flow means are provided at least on said collection unit.

Thus, it is simple to modify the distribution of the collection flow around the device. The fact of adjusting the collection unit alone is sufficient to influence the collection flow.

According to one advantageous solution, said collection unit comprises a wall delimiting an internal space that will collect said clarified water, said wall being provided with means forming a passage for said water towards said internal space, said means forming a passage being wider over one part of said wall than another part of said wall.

In this case, said collection unit preferably has at least one grooved part around part of its periphery.

Such means are perfectly efficient, while being particularly simple in design and therefore inexpensive to make and to install.

Advantageously, said preferred water flow means are also provided on said floating ring.

Thus, this helps to improve the influence of the device on the flow distribution around the device.

In this case, said preferred water flow means provided on said floating ring extend around an angular portion substantially coincident with the portion around which the flow means preferably provided on said collection unit extend.

Advantageously, said preferred flow means extend over about 180°.

Obviously, this angle can be varied without going outside the framework of the invention, particularly as a function of the position of the device and any obstacles that might surround it.

According to one advantageous solution, said floating ring has a bottom in which or close to which are formed at least two angular portions, one enabling the passage of water from the outside of said ring to said central recess with a first flow, the other with at least one recess enabling passage of water from outside said ring to said central recess with a second flow greater than said first flow.

According to one preferred solution, said floating ring has a bottom in which at least one trough is formed that is concave facing the outside of said ring and extending between the periphery of said ring and said central recess.

Once again, the distribution of the water flow entering into the ring is adjusted with simple and efficient means that can be made easily.

According to another characteristic, said collection device is adjustable in height on the inside of said central recess.

This makes it easy to adjust the collection point, in other words the level at which the collection unit is placed under the water surface, this being easier because the invention makes it possible to place the device at the edge of the basin.

In this case, the collection device preferably has two gusset plates, each of which holds a substantially vertical pin installed in said basin.

According to one preferred embodiment, said gusset plates have a bottom at right angle with the sidewalls, said vertical pins having a round section.

This enables easy maintenance of the device, particularly by enabling evacuation of residues that could accumulate in the gusset plates.

The invention also relates to a basin equipped with a collection device of the type comprising a floating ring with a central recess inside which said clarified water can be collected by a collection unit connected to collection means of said clarified water, characterised in that it includes preferred water flow means to facilitate said water collection starting from one peripheral zone around said floating ring rather than from another zone.

Preferably, said collection device is placed close to the periphery of said basin.

According to one advantageous solution, said collection device is installed free to move between two substantially vertical pins.

This guarantees excellent stability of the device on the water surface of the basin, which gives good uniformity of the water flow.

Other characteristics and advantages of the invention will become clearer after reading the following description of a preferred embodiment of the invention given as an illustrative and non-limitative example and the appended drawings among which:

FIGS. 2 and 3 are cross sectional and top views respectively of a water collection device according to the invention.

Figure 1:
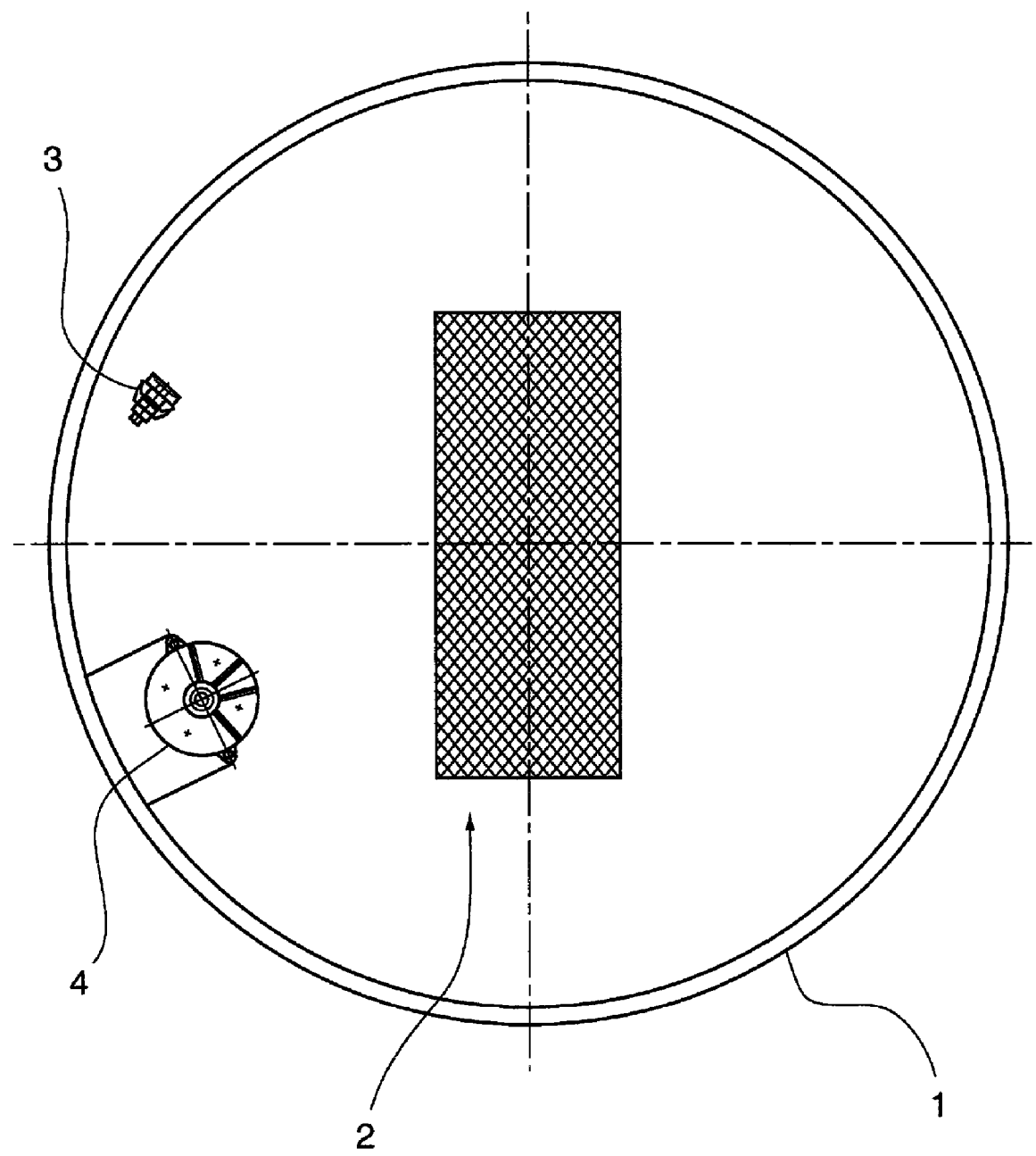
FIG. 1 is a top view of a basin equipped with water collection means according to the invention.

With reference to FIG. 1, the invention is applicable to treatment station basins using the SBR technique, in other words in which the aeration phase (also called oxygenation), and the stirring and settlement phases are performed in sequence.

Thus, a basin delimited by a concrete wall 1 has an aeration zone 2, stirring means 3 and at least one collection device 4.

Remember that in such basins, the water to be treated is brought into contact with activated sludge that is deposited at the bottom of the basin during the settlement phases.

For the purposes of this invention, the collection device is of the type shown in FIGS. 2 and 3.

As shown in these figures, the collection device includes a floating ring 41 with a central recess 411 inside which a collection unit 42 is fitted that will collect the clarified water, this unit being connected to collection means (not shown).

The operating principle is that the floating ring holds the collection device 42 at a predetermined level with respect to the water surface 10, water penetrating into the central recess 411 of the ring as indicated by arrows F1, by the communicating vessels principle.

Water is then collected by the collection device 42.

According to this arrangement, clarified water is collected on the surface while avoiding the collection of any floating residue 101, for example grease on the water surface, the floating ring 41 forming an obstacle for them.

Note that the floating ring 41 has an open structure delimiting an annular space 412 that could be used to introduce ballast, so as to adjust immersion of the device.

For guidance, the ring has a diameter of 1200 mm, its central recess has a diameter of 400 mm, and the height of the ring is 500 mm.

With the principle according to the invention, the collection device includes preferred water flow means to give priority to collection from one peripheral zone rather than from another.

In fact, these preferred flow means are designed to increase the flow around the part 4b of the device, to the detriment of the water flow collected around the part 4a.

As can be seen, the objective is to encourage flow over an angular portion of the device extending around substantially 180°.

According to this embodiment of the invention, the preferred flow means are made by arranging water passages that tend to widen the mouth on one side of the periphery of the unit 42.

Preferably, these water passages are made by forming a portion with grooves 421 over half of the periphery of the mouth of the collection unit 42.

Note that in this case the grooves 421 are triangular in shape, and could be in other shapes, for example oblong or even rectangular in other possible embodiments.

These water passages could also be made by providing orifices (rather than recesses or grooves) depending on the wall of the unit 42, under the level of the mouth.

Furthermore, a preferred water flow is preferred by also providing particular means in the floating ring structure.

According to the preferred embodiment illustrated in FIG. 3, the bottom of the floating ring 41 is provided with troughs 413 (concave facing the outside of the ring), the flow in these troughs being increased as shown by the double arrows (the flow outside these troughs being represented by a single arrow).

As can be seen, there are four of these troughs and they are uniformly distributed around the part 4b of the device. This part 4b corresponds to the part of the device on which the collection device has preferred flow means.

It can be understood that water passages in the unit 42 and the troughs 413 may be in other forms and/or may have other dimensions, particularly so as to calibrate them differently as a function of flow differences to be generated while collecting water at the periphery of the device.

According to another characteristic, the collection device 42 is installed to be adjustable in height inside the central recess of the floating ring 41. To achieve this, the device 42 has lugs that can slide along rods 414 supported by the floating ring 41.

Furthermore, the device 42 is provided with a rotating flange 423 at its base so that it can be connected to a flexible tube.

Furthermore, the floating ring 41 is fitted with two diametrically opposite gusset plates 415 that will each hold a substantially vertical pin installed in the basin.

Preferably, the gusset plates 415 have a rectangular section while the pins 11 are cylindrical.

The device according to the invention that has just been described is particularly suitable for positioning close to the concrete wall 1 of the basin as illustrated in FIG. 1.

The invention claimed is:

1. A clarified water collection device for use in a basin for collecting clarified water, comprising: a floating ring having an outer edge and a bottom; a water inlet disposed interiorly of the outer edge of the floating ring; wherein the water collection device is configured to facilitate a greater flow of water into the water inlet from one peripheral zone around the floating ring than another peripheral zone around the floating ring; and wherein the bottom of the floating ring includes one or more troughs extending from the outer edge to a central portion of the floating ring.

2. The clarified water collection device of claim 1 wherein the water inlet is recessed and located generally centrally within the floating ring.

3. The clarified water collection device of claim 1 wherein said water inlet includes a wall delineating an internal space through which water flows, the wall being provided with a series of openings ununiformly spaced around the inlet.

4. The clarified water collection device of claim 1 including means for varying the radial flow of water into the water inlet over two or more angular regions.

5. The clarified water collection device of claim 1 including one or more channels formed in the floating ring for directing water to the water inlet.

6. The clarified water collection device of claim 1 wherein the water collection device is configured to facilitate the greater flow of water into the inlet over about 180°.

7. The clarified water collection device of claim 1 wherein the water inlet includes a mouth having a series of spaced apart openings formed around the periphery of the mouth.

8. The clarified water collection device of claim 7 wherein the openings are ununiformly spaced around the periphery of the mouth.

9. The clarified water collection device of claim 7 wherein the periphery of the mouth includes at least two segments and wherein one segment includes a series of spaced apart openings and the other segment includes no spaced apart openings or fewer spaced apart openings.

10. The clarified water collection device of claim 1 wherein the water inlet includes a series of openings provided about a periphery thereof and wherein the floating ring includes one or more water channels that channels water to the water inlet and which extends over an angular portion of the floating ring substantially coincident with the series of openings.

11. The clarified water collection device of claim 10 wherein there is provided a series of water channels formed in the floating ring that extends over about 180°.

12. The clarified water collection device of claim 1 wherein the floating ring includes two angular portions, one of the angular portions allowing a greater flow of water to the water inlet than the other.

13. The clarified water collection device of claim 12 wherein the one angular portion includes flow channels formed in the floating ring and the other angular portion includes no flow channels or fewer flow channels than the one angular portion.

14. The clarified water collection device of claim 1 wherein the water inlet is adjustable in height with respect to the floating ring.

15. The clarified water collection device of claim 1 wherein the collection device includes two gusset plates, each of which holds a substantially vertical pin associated with the basin.

16. The clarified water collection device of claim 1 further including a basin with said water collection device disposed in the basin and floating on water contained in the basin.

17. The clarified water collection device of claim 16 wherein the basin includes a wall and wherein the water collection device is disposed adjacent the wall and oriented with respect to the wall such that the greater flow of water enters the water inlet from a direction opposite of the wall.

* * * * *